United States Patent [19]

Hulderman et al.

[11] Patent Number: 5,042,914
[45] Date of Patent: Aug. 27, 1991

[54] LENS FOCUSING MECHANISM

[75] Inventors: George H. Hulderman; Rudolph A. Eisentraut, both of Tucson, Ariz.; John O. Breninger, San Marcos; Harold E. Andrews, Simi Valley, both of Calif.

[73] Assignee: Hughes Aircraft Company, Los Angeles, Calif.

[21] Appl. No.: 426,830

[22] Filed: Oct. 25, 1989

[51] Int. Cl.5 .................... G02B 7/02; G02B 15/00
[52] U.S. Cl. ...................... 359/824; 359/819; 359/694
[58] Field of Search ............... 350/245, 247–248, 350/251, 255–257, 537–544, 500–501, 429–430, 453, 245, 247–257, 320, 252, 427, 563, 564; 355/53, 56, 41, 45, 271; 354/159, 15

[56] References Cited

U.S. PATENT DOCUMENTS

| | | | |
|---|---|---|---|
| 4,353,634 | 10/1982 | Himmelsbach | 350/255 |
| 4,456,356 | 6/1984 | Okabe | 350/255 |
| 4,690,519 | 9/1987 | Clark et al. | 350/429 |
| 4,757,372 | 7/1988 | Betensky et al. | 350/429 |
| 4,802,738 | 2/1989 | Ando et al. | 350/257 |

Primary Examiner—Bruce Y. Arnold
Assistant Examiner—Thong Neuyen
Attorney, Agent, or Firm—R. M. Heald; C. D. Brown; W. K. Denson-Low

[57] ABSTRACT

A lens focusing mechanism 10 including a bracket 18 for retaining a lens 14. The bracket 18 has a bearing 22 attached thereto or integral therewith. The bearing 22 is eccentric relative to the leans 14 and is effective to move the lens 14 along an optical axis 16 thereof. Movement is effectuated by a drive mechanism 34 in a smooth manner and without lubrication. In a specific embodiment, the bearing 22 is eccentric and external to a cylindrical volume defined by the periphery of the lens 14.

15 Claims, 5 Drawing Sheets

FIG. 2
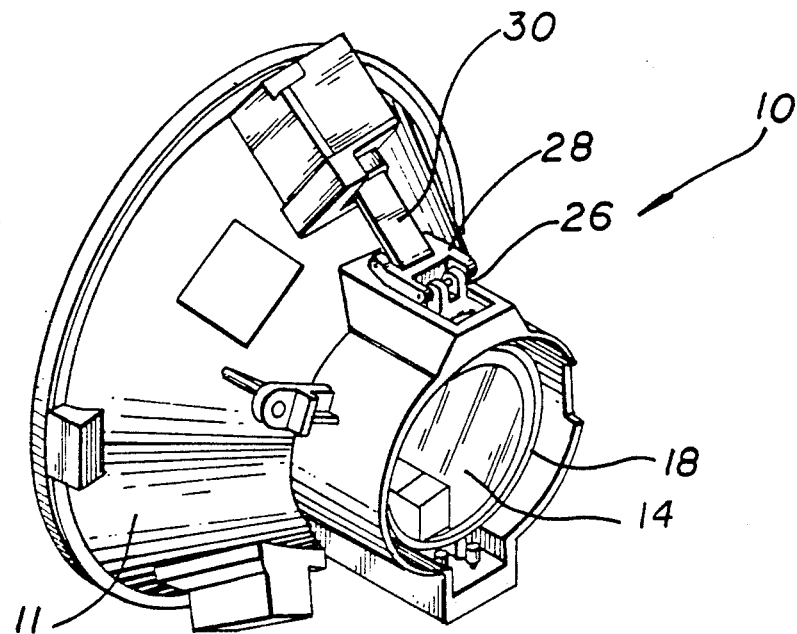
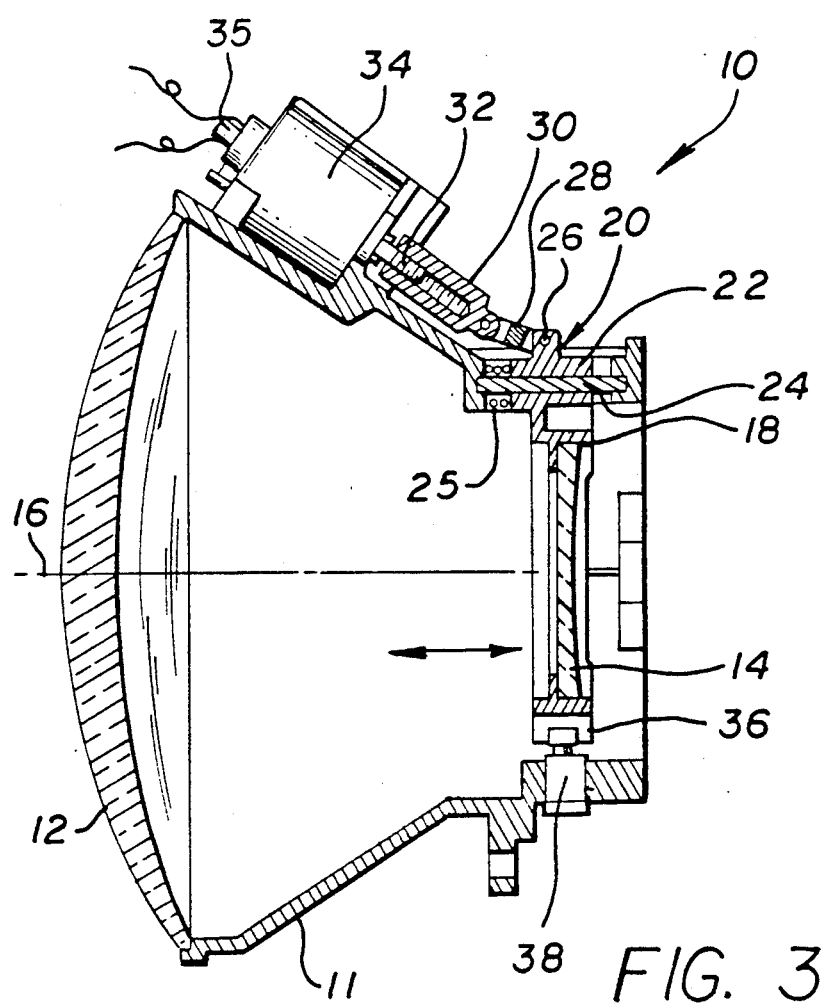
FIG. 3

LENS FOCUSING MECHANISM

BACKGROUND OF THE INVENTION

1. Field of the Invention

The present invention relates to electro-optical systems. More specifically, the present invention relates to autofocus apparatus for electro-optical systems.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Electro-optical lens systems are currently used in many missiles to provide an image which is converted into an electrical signal for display, guidance and/or processing. For missile and other guided vehicle applications, a highly accurate autofocus system is required to automatically focus the lens in response to a control signal. For these applications, the required accuracy is on the order of 100 times the accuracy of autofocus systems for a typical Browning camera. Hence, the tolerances and clearances of conventional autofocus systems for missiles are critical.

The conventional autofocus system for a missile is characterized by the movement of the lens within a threaded shaft. Unfortunately, the threaded shaft tends to adversely affect the optical train of the system. That is, the tolerances of such systems are such that the slight tilting of the lens, resulting from the use of the threaded drive, are sufficient to move the image off the center of the lens.

Further, it is often difficult to move the lens in a smooth manner on the threaded shaft without substantial lubrication. Yet, the use of a lubricant is problematic in that it often dries or dissipates. In addition, lubrication must be used with care to avoid contamination of the lens.

Conventional autofocus systems also tend to be electrically and mechanically unstable, suffer low yields in fabrication, exhibit latent failure modes and tend to be unreliable.

Thus, there is a need in the art to improve the performance and manufacturability of autofocus systems used in missile guidance and other demanding applications.

SUMMARY OF THE INVENTION

The need in the art is addressed by the autofocus system of the present invention which is adapted for use with a lens having a primary optical axis extending through the center thereof. The autofocus system of the present invention includes a bracket for retaining the lens having a bearing attached thereto or integral therewith. The bearing is eccentric relative to the lens and is effective to move the lens along the optical axis thereof, in a smooth manner, in response to a drive mechanism. While lubricants are not required with the design of the present invention, the invention allows the use of solid film lubricants, where desired, which are less likely to contaminate the optical assembly. In a specific embodiment, the bearing is eccentric and external to a cylindrical volume defined by the periphery of the lens.

In more specific embodiments, a linkage is provided between the bearing and the drive mechanism. Two embodiments of the linkage are disclosed, a ball joint design and a flat blade design.

BRIEF DESCRIPTION OF THE DRAWINGS

FIG. 2 is a perspective rear view of the autofocus system of the present invention.

FIG. 3 is a simplified illustrative sectional side view of the autofocus system of the present invention.

DESCRIPTION OF THE INVENTION

Illustrative embodiments and exemplary applications will now be described with reference to the accompanying drawings to disclose the advantageous teachings of the present invention.

Figure 1:
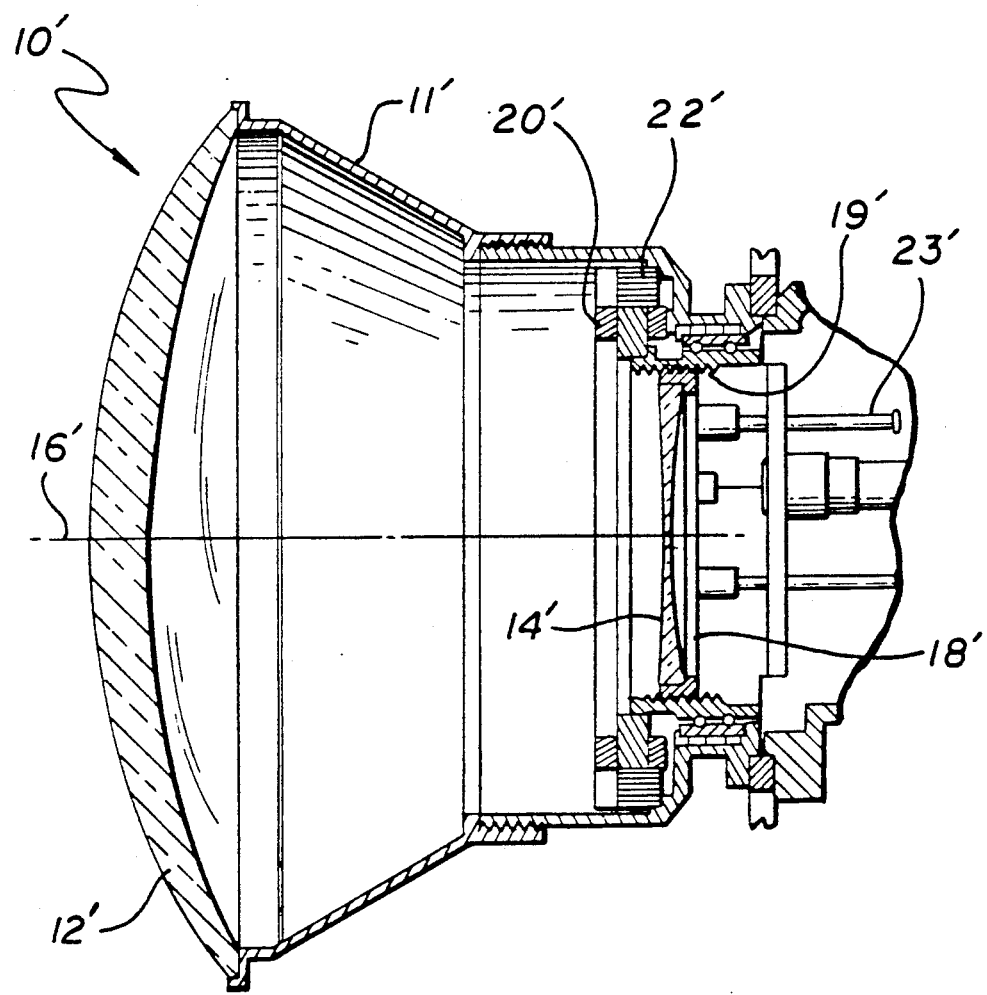
FIG. 1 is a simplified illustrative sectional side view of a conventional autofocus system.

FIG. 1 is a simplified illustrative sectional side view of a conventional autofocus system 10'. The conventional autofocus system 10' includes a housing 11'. The housing 11' retains a primary lens 12' and a secondary lens 14'. The secondary lens 14' is concentric with the primary lens 12'. The primary lens 12' and the secondary lens 14' have a common optical axis 16'. The secondary lens 14' is mounted within a lens cell consisting of an annular bracket 18' which has axial drive screw threads 19' about the periphery thereof. The threads 19' engage mating threads within a drive motor rotor 20'. The motor rotor 20' is concentric with the lens 14' and a drive motor stator 22' which is ordinarily attached to the housing 11. When the drive motor is activated, the lens 14' moves back and forth along the optical axis 16' thereof as a result of the threaded engagement of the bracket 18' with the rotor 20'. Anti-rotation and axial stabilization of the lens cell is provided by (3) spring-loaded guide rods 23'.

FIG. 2 is a perspective rear view of the autofocus system 10 of the present invention. FIG. 3 is a simplified illustrative sectional side view of the autofocus system 10 of the present invention. The autofocus system 10 includes a housing 11 which retains a primary lens 12 and a secondary lens 14. The secondary lens 14 is concentric with the primary lens 12 and has a common optical axis 16 therewith. The secondary lens 14 is mounted within a lens cell 20 containing an annular bracket 18, an eccentric guide bearing 22 which extends from the annular bracket 18, and an anti-rotation tang 36. As shown in FIG. 3, lens 14 is circumscribed and supported by bracket 18 for joint movement along optical axis 16.

A particularly unique aspect of the invention is the provision of the guide bearing 22 which is eccentric relative to the secondary lens 14 and external to a cylindrical volume extending along the optical axis 16 and defined by the periphery of the annular bracket 18.

The guide 22 has a longitudinal axis parallel to the optical axis 16 of the lenses 12 and 14 having a longitudinal axis parallel to the optical axis 16. The guide 22 is adapted to receive a bearing shaft 24. The diametrical clearance fit is ideally in the range of 0.0001-0.0003 inch over the shaft 24 to limit the maximum angular excursion of the lens cell 20. An anti-backlash spring 25 is located coaxial with the bearing shaft 24, between the guide bearing 22 and the housing 11. The anti-backlash spring 25 operates through the guide bearing 22 to push the lens cell 20 to the rear and removes the axial clearance between the driving thread on the shaft 32 and the nut 30. The spring 25 is sized to withstand the inertial loads from the cell 20 on its bearing resulting from acceleration loads applied through the unit housing. When the motor 34 is operating, it will allow the spring 25 to push the lens cell 20 to the rear or it will pull it back against the resistance of the spring. Hence, the system 10 is a zero backlash system. This facilitates a smooth operation. The anti-backlash spring 25 also serves to minimize friction due to off-axis loads.

A solid-film lubricant, such as tungsten disulphide, may be applied to both the shaft 24 and the guide bearing 22, although such lubrication should not be necessary for most applications. In the preferred embodiment, the film thickness is less than 20 millionths of an inch and forms a molecular bond with the base materials (no resin binder is used), and when the film is properly processed, it does not spall off as dust or migrate to other surfaces as a contaminant. Functionally, the guide bearing 22 is canted on the shaft 24 because the force of the anti-backlash spring 25 is reacted by the offset connection with a drive linkage 28. This leaning of the guide bearing 22 on the shaft may be critical to the performance of the bearing in some applications. Two crescent-shaped zones may be provided at the ends of the guide bearing 22 to make contact with the shaft 24 and serve to nestle the guide bearing reliably on the shaft. The straightness and cylindricity of the shaft 24 provide the inherent precision of straight-line travel required of this device. The guide and shaft contact areas must be highly burnished to provide smoothness of motion and low friction. The combination of materials should be chosen to become self burnishing during run-in cycles at manufacture and remain wear resistant within a certain operating life. For example, in the preferred embodiment, tungsten di-sulphide was chosen as a lubricant, stainless steel was chosen for the shaft 24, and titanium alloy was chosen for the guide bearing 22. The nestled position of the guide bearing on the shaft 24 keeps the lens cell 20 firmly seated in its aligned position, even during shock and vibration.

A clevis 26 extends from the guide bearing 22 from the bracket 18 above the shaft aperture. The H-shaped link 28 is pinned to the clevis 26, protruding from the guide bearing 22, at one end and to a drive nut 30 at the other. The H shape effectively provides a tightly restrained anti-rotation for the threaded nut 30. This assures good servo responsivity of the motor to the servo commands and reduces any "hunting" characteristic due to looseness. This tightness also requires precise machining for the motor seat in the aligned position to prevent binding of the linkage in a sidewise direction when assembled. The threaded nut 30 has provision to engage a cross shaft or pin. The link 28 may be given a banana-shaped profile to clear structural elements in the environment.

As shown in the sectional side view of FIG. 3, the drive nut 30 is in threaded engagement with a shaft 32 which extends from a drive motor 34. One end of the shaft 32 engages a blind clearance hole in the threaded nut 30. The other end of the shaft 32 is bonded to the shaft (not shown) of the motor 34. The opposite end of the motor shaft 35 protrudes and is slotted to permit manual rotation, thereby rotating shaft 32, causing nut 30 to move toward or away from motor 34. Movement of nut 32 causes similar movement of attached link 28, clevis 26 and attached bearing guide 22 along bearing shaft 24. This, in turn, causes bracket 18 and lens 14 to move along primary optical axis 16 facilitate manual positioning of the lens 14 to the nominal focus position during optical and electrical alignments. The motor 34 is rigidly attached to the housing 11 37 degrees off the optical axis due to optical path restraints. Hence, the linkage 28 and 30 is a two-pin linkage to accommodate the off-axis motor position.

Figure 4:
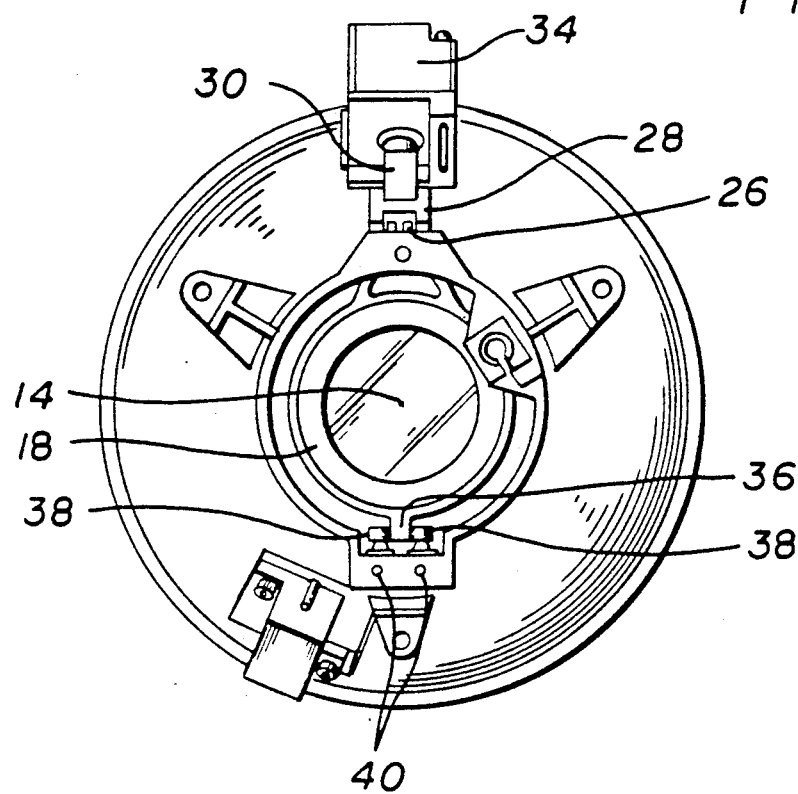
FIG. 4 is a rear view of the autofocus system of the present invention.

A tang 36 is diametrically opposed to the clevis 26 on the bracket 18. As shown in the rear view of FIG. 4, the tang 36 is retained between two eccentric bearings 38. The eccentric bearings 38 are pivotally mounted on housing 11 via set screws 40, to allow for the centering of the bracket 18 (relative to the longitudinal axis 16), and provide for the anti-rotation thereof. The dowel pins in this embodiment, used to attach the link 28 to the clevis 26 were precision fit. As discussed below, the links of the alternative embodiments incorporate a novel and advantageous use of roll (spiral) pins for this purpose. Position and temperature sensors may be incorporated as is known in the art. (A linear variable transformer-LVDT and a thermistor were used in the preferred embodiment as is common in the art).

The unit 10 may be aligned in a conventional manner. During focus adjustment, smooth and precise axial translation of the lens cell 20 is afforded by activation of the motor 34. When the drive motor 34 is activated, the threaded shaft 32 rotates and moves the drive nut 30. The drive nut 30, in turn, moves the H-link 28. Movement of the H-link 28 is transferred to the lens cell 20 via the clevis 26 on the guide 22 of the lens cell 20.

Figure 5:
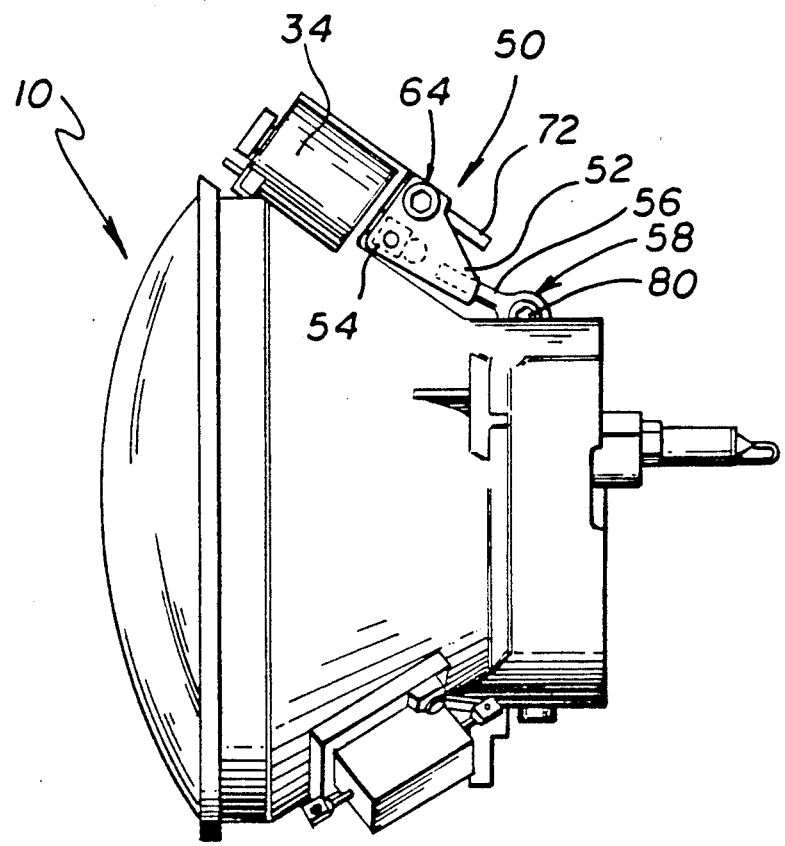
FIG. 5 shows a side view of a first alternative embodiment of the invention in which the H-shaped link is replaced with a ball-joint link.

FIG. 5 shows a side view of a first alternative embodiment of the linkage for the autofocus system 10 of the present invention in which the H-shaped link is replaced with a ball-joint link. The ball-joint accommodates angular misalignments in two directions and serves the primary function of connecting the sliding bearing with the lens cell 20. The ball-joint link 50 includes a housing 52 which accommodates a threaded, split, C-shaped bushing nut 54 in a spherical seat therewithin, and a threaded rod end bearing 56 having an eye bolt 58 at one end thereof. The housing 52 has a U-shaped cross section through the longitudinal axis thereof.

Figure 6A:
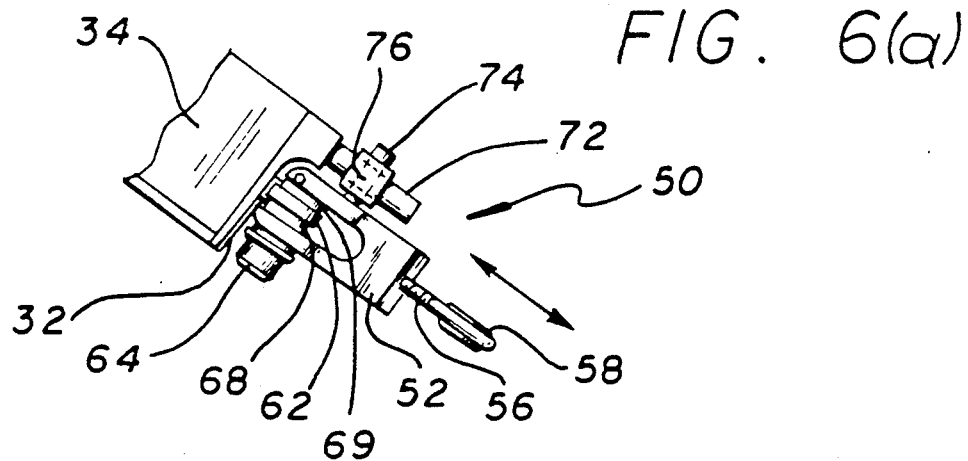
FIG. 6(a) is a top view of the ball-joint linkage of the first alternative embodiment of the autofocus system of the present invention.
Figure 6B:
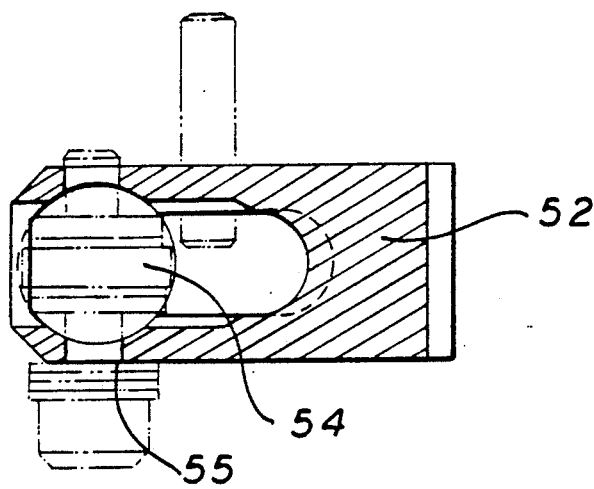
FIG. 6(b) is a sectional top view of the ball-joint linkage of the first alternative embodiment of the autofocus system of the present invention.

FIG. 6(a) is a top view of the ball-joint linkage 50 of the alternative embodiment of the autofocus system of the present invention. FIG. 6(b) is a sectional top view of the ball-joint linkage 50 of the alternative embodiment of the autofocus system of the present invention.

Figure 6C:
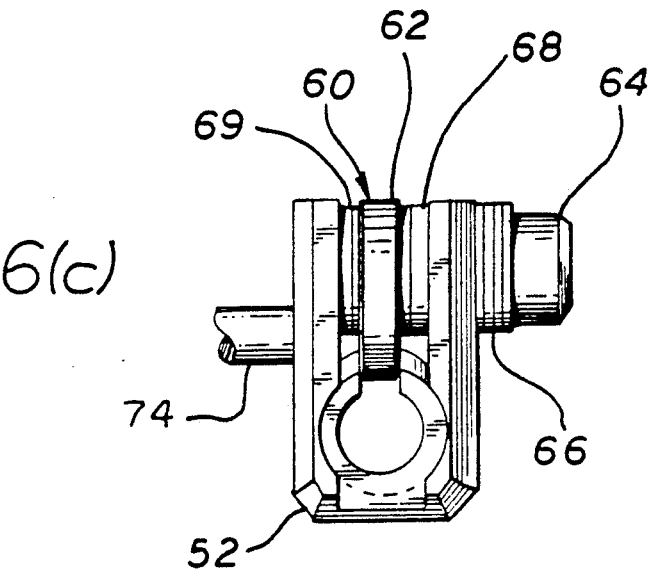
FIG. 6(c) is a view of the ball-joint linkage of the first alternative embodiment of the autofocus system of the present invention.

And FIG. 6(c) is an view of the ball-joint linkage 50 of the alternative embodiment of the autofocus system of the present invention.

The seating of the C-nut 54 in the seat 55 of the housing 52 is illustrated in phantom in the sectional top view of FIG. 6(b). In the preferred embodiment, the C-nut 54 is constructed of nylon and has a threaded aperture to receive a threaded brass shaft from the motor 34. The clearance fit of the C-nut around the motor shaft 32 and the clearance fit of the C-nut within the seat 55 are controlled by a nut and washer arrangement 60 at the top of the housing 52. See FIG. 6(c). The washer arrangement 60 includes a blade 62 which engages the slot in the C-nut 54 and provides anti-rotation for limiting the angular excursion of the split C-shaped nut about a longitudinal axis of the motor 34. A threaded screw 64 extends through a first stainless steel shim washer 66, one side of the housing 52, a washer 68, the blade 62, and a second shim washer 69 into engagement with threads in the second side of the housing 52. Thus, by tightening the screw 64 and/or removing shims from the washers 66 and 69, the clearances in and around the C-nut 54 may be adjusted. The housing 52 basically acts as a C-clamp around the C-nut. The housing 52 squeezes the C-nut 54 until its thread firmly contacts a thread gage. The adjustment is then secured in this position. This adjustment not only eliminates the clearance resulting from thread tolerances, but provides firm contact and improved stiffness of the linkage without a detrimental increase in friction in the autofocus assembly. The adjustment achieves low clearance values without requiring extremely tight tolerances on the detail parts.

Figure 6D:
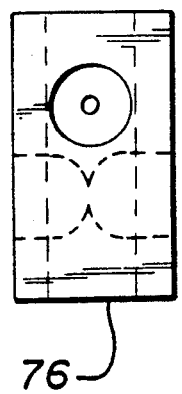
FIGS. 6(d) and (e) show front and side views of the slider block of the ball-joint linkage, respectively.
Figure 6E:
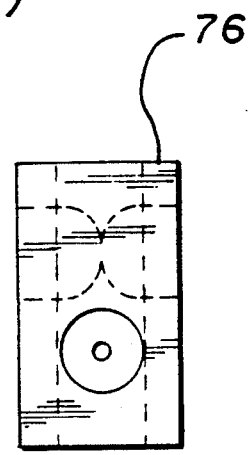

Returning to FIG. 6(a) an anti-rotation arrangement is provided by a first pin 72, which extends from the motor housing in parallel with the motor shaft or pin 32, a second pin 74 which extends from the housing 52 transverse to the first pin 72, and a nylon slider block 76 which links the first and second pins 72 and 74 together. FIGS. 6(d) and (e) show front and side views of the slider block 76, respectively. The slider block 76 moves freely during focus adjustment and is self retaining on the pins 72 and 74.

Returning again to FIG. 6(a), the link housing 52 is threaded at its distal end, relative to the motor end, to receive the threaded end of the rod 56. This affords precise adjustment of the axial clearance at time of assembly. Ordinarily, the threaded rod end is cemented in place once this adjustment is made.

The distal end of the rod 56 includes the eye bolt 58. The eye bolt 58 includes a ball 59 within a socket in the rod 56. The eye bolt 58 is dowel pinned to the clevis 26 of the cell 14 using a tightly wound spiral pin 80. As is known in the art, spirol pins, manufactured by Spirol International Co., are designed to fit snugly into a loosely toleranced hole such as a roughly drilled hole. When installed into a hole smaller than the pin, the spirally wrapped pin adapts to the size, and within limits, to the shape of the hole. This feature is used effectively in this design to allow the pin 80 to tightly fit into the outer two holes of the U-shaped clevis 26 while only snugly fitting the inner hole of the eye bolt 58. The bolt hole is slightly larger than the in-line holes of the clevis 26. When installed, the center part of the pin 80 becomes barrel-shaped to engage the larger diameter of the eye bolt 58. This fitting is controlled by both the tolerances of the parts, and by the assembler rotating (winding) the spiral after the pin is in place to attain the desired fit.

In the preferred embodiment, the ball 59 of the rod end 58 is constructed of hardened steel while the rod 56 is constructed of medium hard steel. The housing 52 and the anti-rotation blade 62 are constructed of aluminum alloy, the C-nut 54 is constructed of nylon, and the pins 72 and 74 are constructed of stainless steel. Those skilled in the art will appreciate that other materials my be used without departing from the scope of the invention.

The operation of the first alternative (ball-joint) embodiment is essentially the same as that of the illustrative (H-link) embodiment. Activation of the motor 34 causes the C-nut 54 to move on the threaded pin 32 and exert a force on the housing 52 via the seat 55. Movement of the housing 52 translates to axial movement of the lens cell 20 via the guide bearing 22 and the rod end 58.

The use of two spherical bushings, i.e., the C-nut 54 and the rod end 58, allows both angular and displacement misalignments to occur in the autofocus assembly without producing binding or an increase in friction in the linkage. The line-of-action of the ball-joint linkage 50 places the two centers of rotation where they produce a very smooth action in translating the lens cell 20. The C-nut 54 contains its swiveling center directly on the center of the motor axis. The rod end bearing 58 contains its swiveling center directly on the center of the pivot pin in the clevis 26 of the lens cell 20. This arrangement eliminates the eccentricities of action found in a two-pin and separate threaded nut linkage system, and produces a much smoother action.

Figure 7:
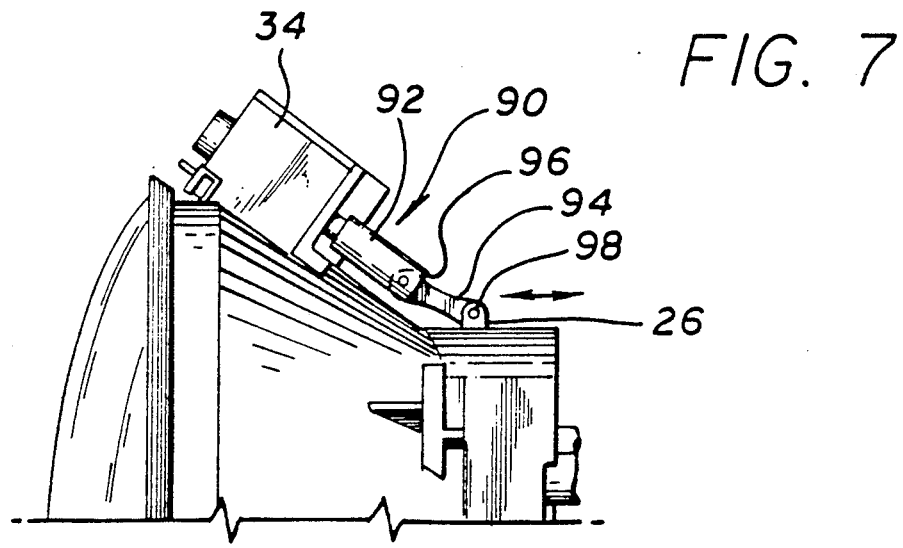
FIG. 7 is a side view of a flat blade embodiment of the linkage for the autofocus system of the present invention.
Figure 8:
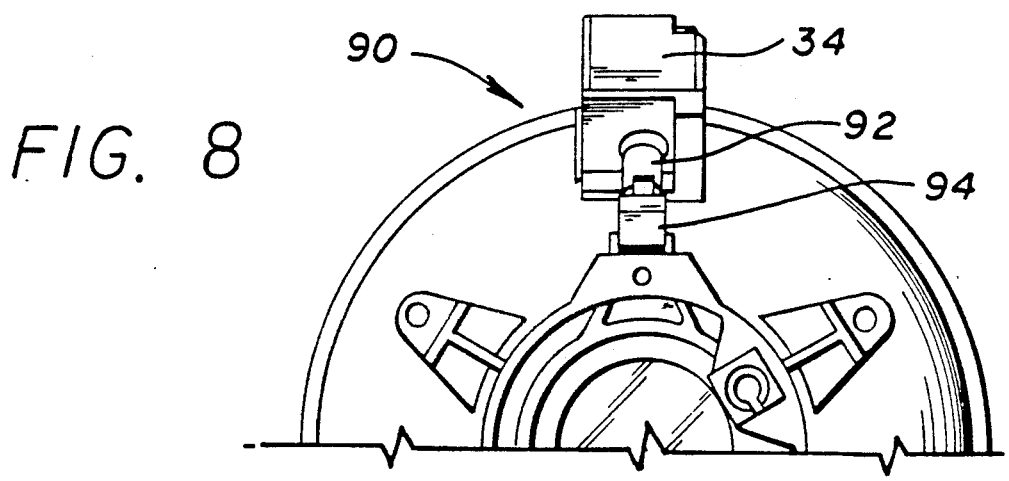
FIG. 8 is a rear view of the flat blade linkage for the autofocus system of the present invention.

FIG. 7 is a side view of a second (flat blade) alternative embodiment of the linkage for the autofocus system 10 of the present invention. FIG. 8 is a rear view of the flat blade linkage for the autofocus system 10 of the present invention. The flat-blade embodiment offers reduced cost relative to the ball-joint linkage and improved performance relative to the H-link. The flat blade linkage 90 includes a nut 92 and the flat blade link 94. The nut 92 threadably engages a shaft extending from the motor 34. The distal end of the nut 92 includes a clevis 96. The clevis 96 of the nut 92 engages the proximal end of the flat blade link 94. The distal end of the flat blade link 94 is connected to the clevis 26 of the lens cell 20 via a spiral pin 98.

Thus, the present invention has been described herein with reference to a particular embodiment for a particular application. Those having ordinary skill in the art and access to the present teachings will recognize additional modifications applications and embodiments within the scope thereof. For example, as is evident above, the invention is not limited to the implementation of the link or the drive motor. The invention is not limited to the particular implementation of the guide bearing. Nor is the invention limited to the construction or application illustrated herein.

It is therefore intended by the appended claims to cover any and all such applications, modifications and embodiments within the scope of the present invention.

Accordingly,

What is claimed is:

1. A lens focusing mechanism for use in moving a lens along a primary optical axis extending through the lens center, and comprising:

bracket means circumscribing and supporting said lens for joint movement along the primary optical axis;

a fixed bearing shaft having a longitudinal axis extending parallel to the primary optical axis;

bearing means slidably supported on said fixed bearing shaft for joint movement with said bracket means, said bearing means including a substantially U-shaped clevis;

a linkage having a housing attached at one end, said linkage further including an opposite end pivotally engaging said clevis; and drive means engaging said housing for moving said linkage and said attached bearing means along said fixed bearing shaft, thereby causing said attached bracket means and lens to move along said primary optical axis.

2. The invention of claim 1 wherein the bearing means is external to a cylindrical volume defined by the periphery of the lens.

3. The invention of claim 1 wherein said linkage includes a ball joint attached to said housing on one end and a spiral pin attached to said bearing means at a second end.

4. The invention of claim 3 wherein said ball joint threadably engages said housing.

5. The invention of claim 3 wherein said linkage includes a threaded, split C-shaped nut disposed within said housing in threaded engagement with said drive means.

6. The invention of claim 5 wherein said linkage includes first anti-rotation means for limiting an angular excursion of the split C-shaped nut about a longitudinal axis of said drive means.

7. The invention of claim 6 wherein said first anti-rotation means is a flat blade mounted on the housing for engagement in the split of said C-nut.

8. The invention of claim 6 including second anti-rotation means for limiting the angular excursion of said housing about the longitudinal axis of said drive means.

9. The invention of claim 8 wherein said second anti-rotation means includes a first and second pins mounted in transverse relation in engagement with a housing of said drive means and said housing of said linkage.

10. The invention of claim 1 wherein said linkage is secured to said bearing means through a spiral pin.

11. The invention of claim 1 said linkage includes a nut constructed to receive said drive means on one end and to receive a flat blade on the other and a flat blade link connecting said nut to said bearing means.

12. The invention of claim 11 wherein said linkage is secured to said bearing means through a spiral pin.

13. The invention of claim 1, wherein said linkage includes a substantially H-shaped link.

14. The invention of claim 13, wherein said housing comprises a threaded nut member pivotally attached to said H-shaped link.

15. The invention of claim 14, wherein said drive means comprises a motor having a threaded, rotatable shaft extending into threaded engagement with said threaded nut member, whereby activation of said motor causes rotation of said threaded shaft, causing said nut member to move toward or away from said motor.

* * * * *